United States Patent [19]

Hanslik

[11] 4,385,883
[45] May 31, 1983

[54] PREHEATED EXTRUDER
[75] Inventor: Wilhelm Hanslik, Vienna, Austria
[73] Assignee: American Maplan Corporation, McPherson, Kans.
[21] Appl. No.: 183,932
[22] Filed: Sep. 3, 1980
[30] Foreign Application Priority Data
  Sep. 4, 1979 [AT] Austria .................................. 5858/79
[51] Int. Cl.³ .............................................. B29B 1/04
[52] U.S. Cl. ............................ 425/204; 264/DIG. 65; 366/83; 366/84; 425/205; 425/DIG. 39
[58] Field of Search ................ 264/DIG. 65; 366/83, 366/84, 149; 425/204, 205, DIG. 39

[56] References Cited
U.S. PATENT DOCUMENTS

| 561,298 | 6/1896 | Werner | 366/84 |
|---|---|---|---|
| 2,494,891 | 1/1950 | Marshall | 366/84 |
| 2,653,351 | 9/1953 | Henning | 425/204 |
| 2,698,962 | 1/1955 | Swallow | 425/204 |
| 3,059,595 | 10/1962 | Locatelli | 425/204 |
| 3,574,890 | 4/1971 | Gresch | 425/205 |
| 3,609,828 | 10/1971 | Compa et al. | 425/205 |
| 3,923,291 | 12/1975 | Matsuoka et al. | 425/205 |
| 3,963,558 | 6/1976 | Skidmore | 366/83 |
| 3,979,488 | 9/1976 | Greenhalgh et al. | 425/204 |
| 4,214,862 | 7/1980 | Kolossow | 425/204 |

FOREIGN PATENT DOCUMENTS
1096887  6/1955  France .

Primary Examiner—Donald E. Czaja
Assistant Examiner—W. Thompson
Attorney, Agent, or Firm—Karl F. Ross

[57] ABSTRACT

An extruder for thermoplastic or elastomeric materials has a mastication stage with one or more feedscrews preceded by a preheating zone in which the incoming bulk material is circulated and possibly recirculated by two screw-type conveyor members or augers in a loop within a heated extension of the extruder housing. The augers may be counterrotatingly disposed in two juxtaposed cylindrical compartments or may be coaxially nested and corotating with opposite pitch.

5 Claims, 3 Drawing Figures

PREHEATED EXTRUDER

FIELD OF THE INVENTION

My present invention relates to an extruder for the shaping of polymeric bulk material, especially thermoplastics and elastomerics, into coherent articles.

BACKGROUND OF THE INVENTION

In such extruders, in which the polymeric material fed in through a hopper is plasticized and masticated by one or more feedscrews prior to being discharged under pressure through a shaping die, the extruder housing is generally heated by external means (electronically or fluidically) to fuse the incoming granules or other particles into a coherent viscous mass. Such fusion advantageously takes place already in a preheating zone located between the housing inlet and the masticating feedscrew or feedscrews.

For maximum efficiency it is, of course, desirable to advance the incoming material through the preheating zone at a rate which, on the one hand, closely approaches the operating capacity of the masticating and discharging mechanism and, on the other hand, allows the entire mass to reach the correct temperature upon passing through that zone. The feed rate and/or the preheating temperature may require modification upon a changeover to a different type of material.

A previously proposed device for such extruders comprises several dished and coaxially superposed heating plates whose bottoms are provided with relatively offset apertures and are individually scraped by bladed wheels rotatable about their common axis to let the material successively pass through the several heating stages constituted by these plates. Similar multistage heaters are known in the field of metallurgy for the roasting of sulfidic ores with or without chlorination.

Such an assembly of stacked heating plates has a relatively limited throughput rate and must therefore be of large dimensions to handle a substantial quantity of material to be treated. If one stage becomes defective, the entire stack must be disassembled to enable its replacement. Since the material passes through the stack only once, heating to high temperatures requires a large number of stages.

OBJECTS OF THE INVENTION

An important object of my present invention is to provide a compact preheating device which obviates the aforestated disadvantages and comprises only a small number of movable elements (preferably not more than two) each of which can be readily replaced even during operation if necessary.

Another object is to provide a device of this character which is easily adaptable to different working materials and/or operating conditions.

SUMMARY OF THE INVENTION

I realize these objects, in accordance with my present invention, by providing, in a preheating zone located in a housing section between an inlet and one or more plasticizing and masticating feedscrews, two-way conveyor means for circulating the incoming material at least once in a substantially closed loop at an elevated temperature.

Pursuant to a more particular feature of my invention, the conveyor means may comprise a first auger passing close to the housing inlet for driving the incoming material to a remote point of the loop and a second auger passing close to that remote point for returning the material to the entrance of a channel which leads to the housing part containing the feedscrew or feedscrews. I further prefer to arrange the channel entrance in the vicinity of the inlet and to provide a passage therebetween enabling recirculation of the working material through the loop upon complete or partial obstruction of the channel, i.e. during standstill of the feedscrew mechanism or when the operating rate thereof does not keep pace with that of the preheating conveyor. In such a case, therefore, at least part of the incoming material is recirculated through the loop before being admitted to the main part of the extruder housing.

The two augers of the preheating conveyor, or at least one of them, could be replaced by a pair of interleaved and counterrotating augers or screws of the type known in the extrusion art. They could be positioned horizontally or vertically, for example, dependable on the available space.

BRIEF DESCRIPTION OF THE DRAWING

The above and other features of my present invention will now be described in detail with reference to the accompanying drawing in which.

SPECIFIC DESCRIPTION

Figures 1, 2, 3:
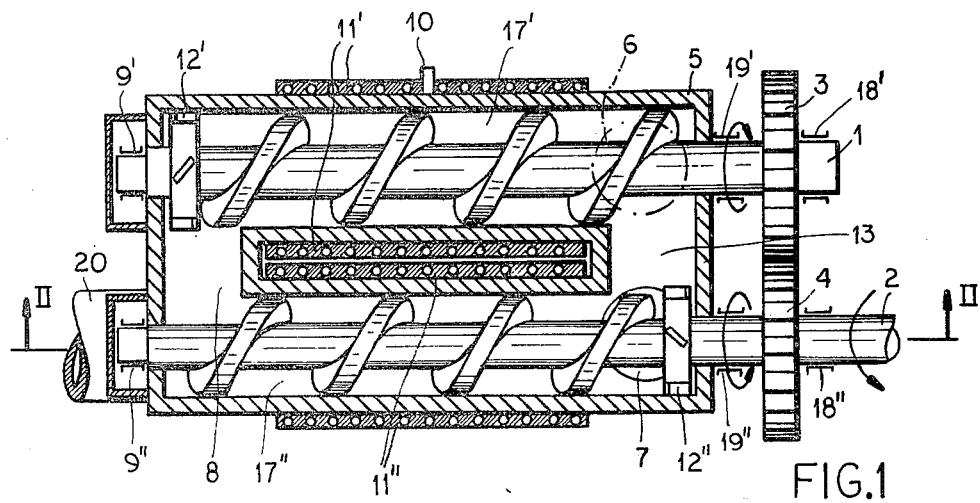
FIG. 1 is a sectional plan view of a preheating section of an extruder housing embodying my invention.
FIG. 2 is a cross-sectional view taken on the line II—II of FIG. 1.
FIG. 3 is a fragmentary sectional view of a modified preheating section according to my invention.

In FIGS. 1 and 2 I have shown an extruder housing 5 with a lower main part 20 of cylindrical shape and an upper preheating section in the form of a flat rectangular prism divided into two cylindrical compartments 17' and 17" occupied by respective augers or screws 1 and 2. These two augers, coupled by meshing gears 3 and 4 for joint rotation in opposite senses, are driven by a nonillustrated motor which may or may not be the one that drives a feedscrew 16 in the main housing part 20. Compartments 17' and 17" are interconnected at opposite ends of augers 1 and 2 by two passages 8 and 13 to form a closed loop for the circulation and possible recirculation of granular or otherwise comminuted polymeric bulk material fed in through a hopper 6 located above an inlet end of compartment 17' as indicated by a dot-dash circle in FIG. 1. Augers 1 and 2 are journaled outside these compartments in respective bearings 9', 18', 19' and 9", 18", 19". Heating jackets 11' and 11" and similar jackets 14a and 14b respectively surround the two compartments as well as housing part 20 and are traversed by a hot fluid such as steam from a nonillustrated source whose temperature is controlled by a heat sensor 10 disposed in the wall of compartment 17'. Through a channel 7, transversely offset from hopper 6 as best seen in FIG. 1, compartment 17" communicates with the cylindrical interior of the lower housing part 20 which terminates in a conventional extrusion die not shown. The exit end of each auger 1 and 2 carries a respective agitator wheel 12', 12" with slanting blades. A dosing device 15, which could be a manually adjustable shutter but is here shown as a spring-loaded gate opening in response to a predetermined pressure differential thereacross, is inserted in channel 7 between compartment 17" and the entrance to the lower housing part.

In operation, rotation of augers 1 and 2 causes the incoming bulk material from hopper 6 to be advanced through compartment 17' in one direction (right to left) and thence, after traversing passage 8, to flow through compartment 17" in the opposite direction (left to right) before reaching the channel 7. If gate 15 is closed, or if feedscrew 16 does not rotate, all the incoming material is recirculated via passage 13 for further preheating. In this way, the material can be brought to the requisite temperature before extrusion is started. Thereafter, only so much of this material as can be handled by the feedscrew 16 will pass through gate 15 while the remainder is being recirculated. A dosimeter similar to device 15 may also be inserted in hopper 6 to control the feed rate.

Alternatively, the stationary dosing device 15 could be replaced by a screw-type or other positive-acting feeder in hopper 6 to force the working material into the preheating zone at a controlled rate. Such a feeder could be rotated jointly with augers 1 and 2, possibly with interposition of a slipping clutch.

In FIG. 3 I have shown a modified preheating conveyor inside a section of a housing 105 surrounded by a heater 111, this assembly comprising an outer auger or screw 101 and an inner auger or screw 102 coaxially corotating therewith; the two augers, whose threads are of opposite pitch, may in fact constitute a unitary body. Incoming material reaches the outer auger 101 through a hopper 106 and is returned by the inner auger 102 to the vicinity of a channel 107 leading to a nonillustrated feedscrew in a main housing part not shown in FIG. 3, essentially as illustrated in FIG. 2. Dosing or gating devices as described above could, of course, also be used with the assembly of FIG. 3. Like the augers 1, 2 of the preceding embodiment, auger pair 101, 102 may be coupled with the main feedscrew drive or with a force feeder for joint rotation. Screws 101, 102 lie in a compartment 117 of housing 105 whose opposite ends form passages, functionally equivalent to those designated 8 and 13 in FIGS. 1 and 2, for the recirculation of the comminuted material as indicated by the arrows in FIG. 3.

I claim:

1. In an extruder having a housing provided with an inlet for polymeric bulk material to be shaped into a coherent article, at least one feedscrew in said housing for plasticizing and masticating said material prior to discharging it under pressure through a shaping die, and heating means for maintaining said material at an elevated temperature within said housing, the combination therewith of a preheating zone in a section of said housing located between said inlet and said feedscrew, said heating means extending to said section for maintaining same at an elevated temperature, a first auger in said section passing close to said inlet for feeding the incoming material to a location remote from said inlet, and a second auger passing close to said remote location for feeding the material delivered by said first auger to the entrance of a channel leading to a main housing part containing said feedscrew, said housing forming a first passage in the vicinity of said inlet and a second passage at said remote location interconnecting the feed paths of said material in a closed loop, said entrance communicating directly with said first passage for enabling recirculation of said material through said closed loop by said first and second augers upon obstruction of said channel.

2. The combination defined in claim 1, further comprising dosing means located in said channel.

3. The combination defined in claims 1 or 2 wherein at least one of said augers is provided with agitator blades.

4. The combination defined in claims 1 or 2 wherein said section forms two cylindrical compartments in which said augers are disposed side by side, said compartments communicating at opposite extremities with one another.

5. The combination defined in claims 1 or 2 wherein one of said augers is coaxially nested in the other of said augers.

* * * * *